(12) United States Patent
Makihara et al.

(10) Patent No.: US 10,065,478 B2
(45) Date of Patent: Sep. 4, 2018

(54) THERMAL MANAGEMENT SYSTEM FOR VEHICLE

(71) Applicant: DENSO CORPORATION, Kariya, Aichi-pref. (JP)

(72) Inventors: Masamichi Makihara, Kariya (JP); Takashi Yamanaka, Kariya (JP); Yasumitsu Omi, Kariya (JP); Koji Miura, Kariya (JP); Norihiko Enomoto, Kariya (JP); Nobuharu Kakehashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/120,530

(22) PCT Filed: Feb. 23, 2015

(86) PCT No.: PCT/JP2015/000860
§ 371 (c)(1),
(2) Date: Aug. 22, 2016

(87) PCT Pub. No.: WO2015/133083
PCT Pub. Date: Sep. 11, 2015

(65) Prior Publication Data
US 2017/0008373 A1    Jan. 12, 2017

(30) Foreign Application Priority Data

Mar. 5, 2014    (JP) .................................. 2014-042925

(51) Int. Cl.
*B60H 1/00*        (2006.01)
*B60K 11/02*       (2006.01)
(Continued)

(52) U.S. Cl.
CPC ..... *B60H 1/00899* (2013.01); *B60H 1/00385* (2013.01); *B60H 1/00807* (2013.01);
(Continued)

(58) Field of Classification Search
CPC ............ B60H 1/00385; B60H 1/00807; B60H 1/00828; B60H 1/00885;
(Continued)

(56) References Cited

U.S. PATENT DOCUMENTS 9,180,750 B2 * 11/2015 Kishita ............... B60L 11/1875
2002/0014330 A1 * 2/2002 Guyonvarch ...... B60H 1/00007
165/202

(Continued)

FOREIGN PATENT DOCUMENTS

CN          1570529 A       1/2005
JP          2002096621 A    4/2002
(Continued)

*Primary Examiner* — Len Tran
*Assistant Examiner* — Gordon Jones
(74) *Attorney, Agent, or Firm* — Harness, Dickey & Pierce, P.L.C.

(57) ABSTRACT

A thermal management system for a vehicle includes a high-temperature side pump that draws and discharges a heat medium, a compressor that draws and discharges a refrigerant in a refrigeration cycle, a high-pressure side heat exchanger that exchanges heat between a high-pressure side refrigerant in the refrigeration cycle and the heat medium circulated by the high-temperature side pump, a heat medium-outside air heat exchanger that exchanges heat between the heat medium circulated by the high-temperature side pump and outside air, and a pump control unit that controls an operation of the high-temperature side pump such that the operation of the high-temperature side pump is
(Continued)

continued even after the compressor is stopped. Thus, the cycle efficiency exhibited when restarting the compressor can be improved.

7 Claims, 7 Drawing Sheets

(51) Int. Cl.
*F25B 1/00* (2006.01)
*B60K 6/22* (2007.10)
*B60K 1/00* (2006.01)

(52) U.S. Cl.
CPC ..... *B60H 1/00828* (2013.01); *B60H 1/00885* (2013.01); *B60K 6/22* (2013.01); *B60K 11/02* (2013.01); *F25B 1/00* (2013.01); *B60H 2001/00928* (2013.01); *B60K 2001/003* (2013.01); *B60K 2001/005* (2013.01); *B60K 2001/006* (2013.01); *B60Y 2200/92* (2013.01); *B60Y 2400/88* (2013.01); *B60Y 2400/89* (2013.01); *Y10S 903/904* (2013.01)

(58) Field of Classification Search
CPC ............ B60H 2001/00928; B60K 6/22; B60K 11/02; B60K 2001/003; B60K 2001/005; B60K 2001/006; F25B 1/00; B60Y 2200/92; B60Y 2400/88; B60Y 2400/89; Y10S 903/904

See application file for complete search history.

(56) References Cited

U.S. PATENT DOCUMENTS

| | | | |
|---|---|---|---|
| 2002/0144510 A1* | 10/2002 | Park | F25D 11/022 62/186 |
| 2004/0035130 A1 | 2/2004 | Amaral et al. | |
| 2004/0050089 A1 | 3/2004 | Amaral | |
| 2004/0089003 A1 | 5/2004 | Amaral et al. | |
| 2004/0089014 A1 | 5/2004 | Amaral et al. | |
| 2013/0061627 A1 | 3/2013 | Neumeister et al. | |
| 2013/0192271 A1* | 8/2013 | Barnhart | F25B 21/04 62/3.3 |
| 2015/0128632 A1 | 5/2015 | Kishita et al. | |

FOREIGN PATENT DOCUMENTS

| | | |
|---|---|---|
| JP | 2004050874 A | 2/2004 |
| JP | 2004515394 A | 5/2004 |
| JP | 2007322022 A | 12/2007 |
| JP | 2013001160 A | 1/2013 |
| JP | 2013060190 A | 4/2013 |

* cited by examiner

THERMAL MANAGEMENT SYSTEM FOR VEHICLE

CROSS REFERENCE TO RELATED APPLICATIONS

This application is a U.S. National Phase Application under 35 U.S.C. 371 of International Application No. PCT/JP2015/000860 filed on Feb. 23, 2015 and published in Japanese as WO 2015/133083 A1 on Sep. 11, 2015. This application is based on and claims the benefit of priority from Japanese Patent Application No. 2014-042925 filed on Mar. 5, 2014. The entire disclosures of all of the above applications are incorporated herein by reference.

FIELD OF THE INVENTION

The present disclosure relates to a thermal management system for use in vehicles.

BACKGROUND ART

Conventionally, for example, Patent Document 1 describes an automobile temperature-adjustment device including a heat pump and a secondary cooling circuit. In the related art, the heat pump includes a compression type main refrigerant circuit that takes heat from a low-temperature heat source, and transfers at least part of that heat to a high-temperature heat source. The secondary cooling circuit has a pump for circulation of a coolant liquid.

The low-temperature heat source and the high-temperature heat source are connected to each other by a compressor and an expansion valve. A refrigerant absorbs heat from the low-temperature heat source, and vaporizes. The compressor draws the vaporized refrigerant and feeds it to the high-temperature heat source. The refrigerant is condensed and cooled in the high-temperature heat source. The expansion valve decompresses the refrigerant condensed in the high-temperature heat source. The refrigerant decompressed by the expansion valve is fed to the low-temperature source.

The high-temperature heat source includes a refrigerant-coolant heat exchanger that thermally connects the main refrigerant circuit to the secondary cooling circuit. The refrigerant-coolant heat exchanger exchanges heat between the refrigerant in the main refrigerant circuit, and the coolant liquid in the secondary cooling circuit.

The secondary cooling circuit is connectable to an external heat exchanger. The external heat exchanger exchanges heat between the coolant liquid in the secondary cooling circuit, and air outside an automobile.

RELATED ART DOCUMENT

Patent Document

[Patent Document 1] Japanese Translation of PCT International Application Publication No. JP 2004-515394 A

SUMMARY OF INVENTION

Based on studies by the inventors of the present application, when a secondary cooling circuit is connected to an external heat exchanger, in the related art, the external heat exchanger is designed to dissipate heat included in the coolant liquid of the secondary cooling circuit into the air outside the automobile, thereby cooling the cooling liquid in the secondary cooling circuit.

When the compressor is stopped in this operating state, if the pump stops at the same time as the compressor does, the cooling of the coolant liquid by the external heat exchanger is quickly terminated, possibly keeping the refrigerant-coolant heat exchanger at a high temperature. When the secondary cooling circuit receives heat from an engine or the like, the temperatures of the refrigerant-coolant heat exchanger and the coolant liquid might increase.

If the refrigerant-coolant heat exchanger is kept at high temperature, the pressure on the refrigerant side of the refrigerant-coolant heat exchanger also remains high, causing the compressor to discharge the refrigerant toward the higher pressure portion at the start-up of the compressor, which needs a high starting torque, resulting in increased power consumption.

When the compressor is restarted with the temperature of the coolant liquid increased, the refrigerant-coolant heat exchanger allows the refrigerant to exchange heat with the high-temperature coolant liquid, making it difficult to decrease the temperature and pressure of the refrigerant. Also, in this case, power consumption of the compressor might increase, disadvantageously degrading cycle efficiency.

The present disclosure has been made in view of the foregoing matter, and it is an object of the present disclosure to provide a thermal management system for a vehicle that suppresses degradation in cycle efficiency when restarting a compressor.

A thermal management system for a vehicle according to an aspect of the present disclosure includes: a first pump that draws and discharges a heat medium; a compressor that draws and discharges a refrigerant in a refrigeration cycle; a high-pressure side heat exchanger that exchanges heat between a high-pressure side refrigerant in the refrigeration cycle and the heat medium circulated by the first pump; a heat medium-outside air heat exchanger that exchanges heat between the heat medium circulated by the first pump and outside air; and a pump control unit that controls an operation of the first pump such that the operation of the first pump is continued even after the compressor is stopped.

Since the operation of the first pump is continued even after the compressor is stopped, the heat medium can be cooled by the heat medium-outside air heat exchanger. Thus, the heat medium can be prevented from keeping its temperature high or from increasing its temperature after the compressor is stopped, thereby decreasing the pressure of the high-pressure side heat exchanger. As a result, the temperature and pressure of the refrigerant can be prevented from increasing when restarting the compressor, and thereby it can suppress the degradation in cycle efficiency.

DESCRIPTION OF EMBODIMENTS

Embodiments will be described below with reference to the accompanying drawings. Note that in the embodiments below, the same or equivalent parts are indicated by the same reference characters throughout the figures.

First Embodiment

Figure 1:
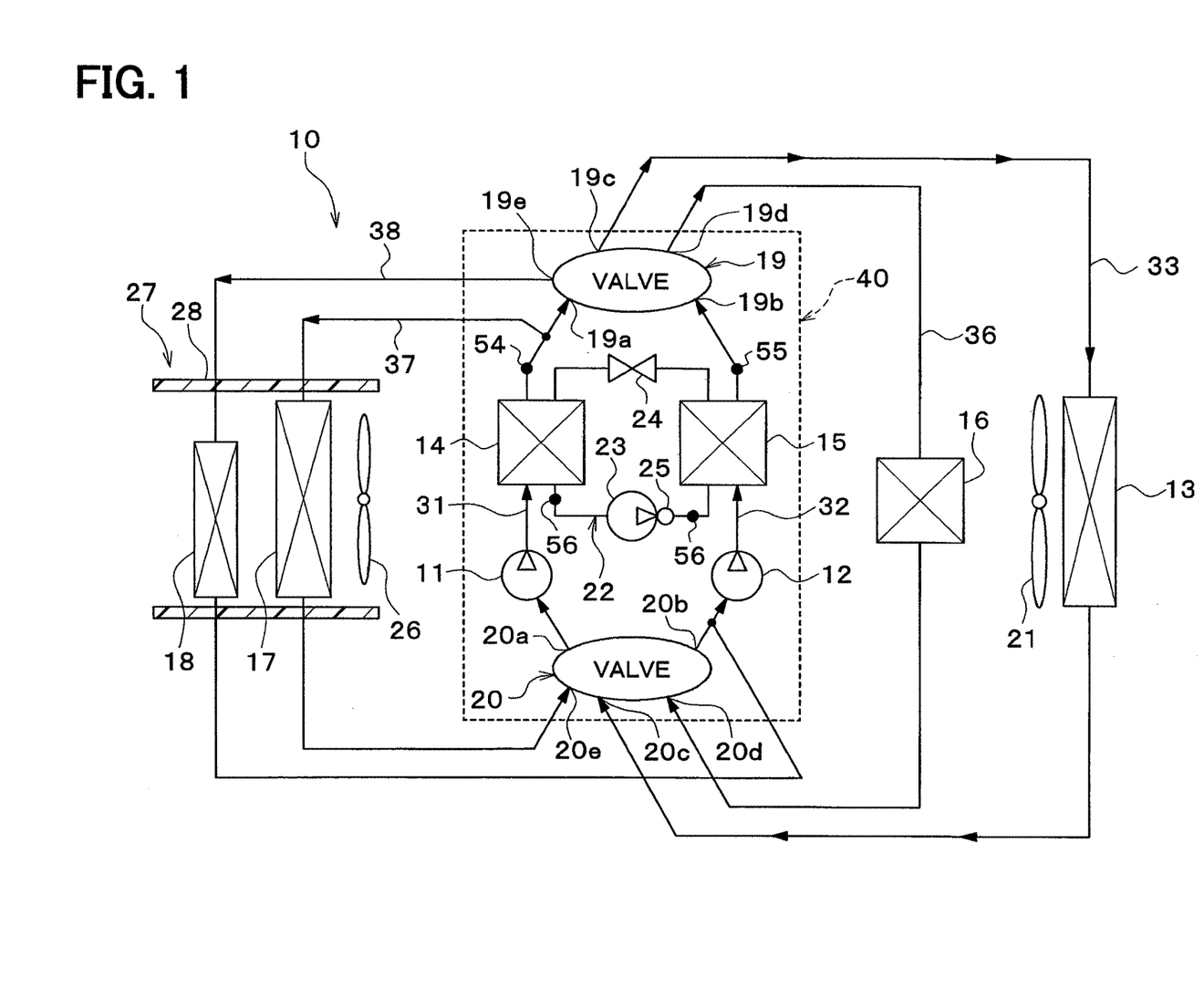
FIG. 1 is an entire configuration diagram of a vehicle thermal management system according to a first embodiment.

A vehicle thermal management system 10 shown in FIG. 1 is used to adjust various devices mounted on a vehicle or an interior of the vehicle to appropriate temperatures. In this embodiment, the vehicle thermal management system 10 is applied to a hybrid vehicle that can obtain the driving force for traveling from both an engine (internal combustion engine) and a traveling electric motor.

The hybrid vehicle of this embodiment is configured as a plug-in hybrid vehicle that can charge the battery (vehicle-mounted battery) mounted on the vehicle, with power supplied from an external power source (commercial power source) during stopping of the vehicle. For example, a lithium ion battery can be used as the battery.

The driving force output from the engine is used not only to cause the vehicle to travel, but also to operate a power generator. The power generated by the power generator and the power supplied from an external power source can be stored in the battery. Such power stored in the battery is supplied to the traveling electric motor as well as electric devices included in the vehicle thermal management system 10.

As shown in FIG. 1, the vehicle thermal management system 10 includes a low-temperature side pump 11, a high-temperature side pump 12, a radiator 13, a coolant cooler 14, a coolant heater 15, a temperature-adjustment target device 16, a cooler core 17, a heater core 18, a first switching valve 19, and a second switching valve 20.

Each of the low-temperature side pump 11 and the high-temperature side pump 12 is an electric pump for drawing and discharging the coolant (heat medium). The coolant is a fluid as the heat medium. In this embodiment, the coolant suitable for use can include a liquid containing at least ethylene glycol, dimethylpolysiloxane or a nanofluid, or an antifreezing solution.

The radiator 13, the coolant cooler 14, the coolant heater 15, and the temperature-adjustment target device 16 are coolant circulation devices (heat-medium circulation devices) through which the coolant circulates.

The radiator 13 is a heat exchanger (heat medium-outside air heat exchanger) that exchanges heat between the coolant and the outside air (vehicle exterior air). The radiator 13 serves as a heat radiator that dissipates heat from the coolant into the outside air when the temperature of the coolant is higher than the outside air temperature, and as a heat absorber that absorbs heat of the outside air into the coolant when the temperature of the coolant is lower than the outside air temperature.

The radiator 13 receives the outside air blown by an exterior blower 21. The exterior blower 21 is an outside air blower that blows the outside air toward the radiator 13 and configured of an electric blower. The radiator 13 and the exterior blower 21 are disposed at the forefront of the vehicle. Thus, traveling air can hit the radiator 13 during traveling of the vehicle.

The coolant cooler 14 is a cooler for cooling the coolant. Specifically, the coolant cooler 14 is a low-pressure side heat exchanger that cools the coolant by exchanging heat between the coolant and a low-pressure side refrigerant in a refrigeration cycle 22. The coolant inlet side (heat-medium inlet side) of the coolant cooler 14 is connected to the coolant discharge side (heat-medium discharge side) of the low-temperature side pump 11.

The coolant heater 15 is a heater for heating the coolant. Specifically, the coolant heater 15 is a high-pressure side heat exchanger that heats the coolant by exchanging heat between the coolant and a high-pressure side refrigerant in the refrigeration cycle 22. The coolant inlet side (heat-medium inlet side) of the coolant heater 15 is connected to the coolant discharge side (heat-medium discharge side) of the high-temperature side pump 12.

The refrigeration cycle 22 is a vapor-compression refrigerator that includes a compressor 23, the coolant heater 15, an expansion valve 24, and the coolant cooler 14. The refrigeration cycle 22 of this embodiment forms a subcritical refrigeration cycle in which a high-pressure side refrigerant pressure does not exceed the critical pressure of the refrigerant, using a fluorocarbon refrigerant as the refrigerant.

The compressor 23 is an engine-driven compressor that is driven by a rotary driving force transferred thereto from the internal combustion engine (engine) via a pulley, a belt, or the like. The compressor 23 is a fixed displacement compressor that adjusts a refrigerant discharge capacity by changing an operating rate of the compressor through the connection and disconnection of an electromagnetic clutch. Alternatively, the compressor 23 may be a variable displacement compressor capable of adjusting a refrigerant discharge capacity by changing its discharge displacement.

The coolant heater 15 is a condenser that condenses a high-pressure side refrigerant by exchanging heat between the coolant and the high-pressure side refrigerant discharged from the compressor 23. The expansion valve 24 is a decompression device that decompresses and expands a liquid-phase refrigerant flowing out of the coolant heater 15.

The coolant cooler 14 is an evaporator that evaporates a low-pressure refrigerant by exchanging heat between the coolant and the low-pressure refrigerant decompressed and expanded by the expansion valve 24. The gas-phase refrigerant evaporated at the coolant cooler 14 is drawn into and compressed by the compressor 23.

The radiator 13 serves to cool the coolant by the outside air, while the coolant cooler 14 serves to cool the coolant by the low-pressure refrigerant in the refrigeration cycle 22. Specifically, the radiator 13 cannot cool the coolant to a temperature lower than that of the outside air, while the coolant cooler 14 can cool the coolant to a temperature lower than that of the outside air. That is, the coolant cooled by the coolant cooler 14 is allowed to flow through the radiator 13, and absorbs heat from the outside air in the radiator 13.

The temperature-adjustment target device 16 is a heat transfer device having a flow path through which the coolant flows and serving to transfer heat with respect to the coolant. Examples of the temperature-adjustment target device 16 can include an inverter, a battery, a battery-temperature adjustment heat exchanger, a traveling electric motor, an engine device, a cold storage portion, a ventilation-air heat recovery heat exchanger, and a coolant-coolant heat exchanger.

The inverter is a power converter that converts a direct-current (DC) power supplied from the battery into an alternating-current (AC) voltage to output the AC voltage to the traveling electric motor.

The battery-temperature adjustment heat exchanger is a heat exchanger (air-heat medium heat exchanger) disposed in a ventilation-air route to the battery and adapted to exchange heat between the ventilation air and the coolant.

Engine components can include a turbocharger, an intercooler, an exhaust gas recirculation (EGR) cooler, a continuously variable transmission (CVT) warmer, a CVT cooler, an exhaust-heat recovery device, and the like.

The turbocharger is a supercharger that supercharges intake air of the engine (intake). The intercooler is an intake cooler (intake air-heat medium heat exchanger) that cools a supercharged intake air by exchanging heat between the coolant and the supercharged intake air compressed by the turbocharger to have a high temperature.

The EGR cooler is an exhaust air-coolant heat exchanger (exhaust air-heat medium heat exchanger) that cools exhaust air by exchanging heat between the coolant and an engine exhaust gas (exhaust air) to be returned to the intake side of the engine.

The CVT (continuously variable transmission) warmer is a lubricating oil-coolant heat exchanger (lubricating oil-heat medium heat exchanger) that heats a lubricating oil (CVT oil) by exchanging heat between the coolant and the CVT oil for lubricating the CVT.

The CVT cooler is a lubricating oil-coolant heat exchanger (lubricating oil-heat medium heat exchanger) that cools the CVT oil by exchanging heat between the coolant and the CVT oil.

The exhaust-heat recovery device is an exhaust air-coolant heat exchanger (exhaust air-heat medium heat exchanger) that exchanges heat between the exhaust air and the coolant, thereby absorbing heat from the exhaust air into the coolant.

The cold storage portion stores therein hot heat or cold heat contained in the coolant. Examples of the cold storage portion can include a chemical heat-storage material, a thermal insulation tank, and a latent-heat type heat storage portion (paraffin or hydrate material).

The ventilation-air heat recovery heat exchanger is a heat exchanger that recovers heat (cold heat or hot heat) to be exhausted to the outside by ventilation. For example, the ventilation-air heat recovery heat exchanger can recover heat (cold heat or hot heat) to be exhausted to the outside by ventilation, thereby reducing power required for air cooling and heating.

The coolant-coolant heat exchanger is a heat exchanger that exchanges heat between coolants. For example, the coolant-coolant heat exchanger exchanges heat between the coolant in the vehicle thermal management system 10 (coolant circulated by the low-temperature side pump 11 or high-temperature side pump 12) and the coolant in an engine cooling circuit (a circuit through which the coolant for cooling the engine circulates), thereby enabling the heat transfer between the vehicle heat management system 10 and the engine cooling circuit.

The cooler core 17 is an air cooling heat exchanger (air cooler) that cools ventilation air into the vehicle interior by exchanging heat between the coolant and the ventilation air into the vehicle interior. Thus, the cooler core 17 allows the coolant cooled by the coolant cooler 14, a device generating cold heat, and the like to circulate therethrough.

The heater core 18 is an air heating heat exchanger (air heater) that heats ventilation air into the vehicle interior by exchanging heat between the coolant and the ventilation air into the vehicle interior. Thus, the heater core 18 allows the coolant heated by the coolant heater 15, a device generating hot heat, and the like to circulate therethrough.

The cooler core 17 and the heater core 18 receive inside air (vehicle interior air), outside air, or a mixed air of the inside air and outside air blown by an interior blower 26. The interior blower 26 is a blower that blows the air toward the cooler core 17 and the heater core 18 and configured of an electric blower.

The cooler core 17, the heater core 18, and the interior blower 26 are accommodated in a casing 28 of an interior air-conditioning unit 27 in the vehicle air conditioner. The interior air-conditioning unit 27 is disposed inside a dashboard (instrumental panel) at the foremost portion of the vehicle interior. The casing 28 forms an outer shell of the interior air-conditioning unit 27.

The casing 28 forms an air passage for the ventilation air to be blown into the vehicle interior. The casing 28 is formed of resin (for example, polypropylene) with some elasticity and excellent strength.

An inside/outside air switching device (not shown) is disposed at the most upstream side of the interior ventilation-air flow in the casing 28. The inside/outside air switching device is an inside/outside air introduction portion that switches between the inside air and the outside air to introduce the switched air to the casing 28.

Further, in the most downstream portion of the ventilation air flow in the casing 28, openings are provided for blowing conditioned air having its temperature adjusted by the cooler core 17 and the heater core 18, into the vehicle interior as a space to be air-conditioned.

The low-temperature side pump 11 is disposed in a low-temperature side pump flow path 31. The coolant cooler 14 is disposed on the coolant discharge side of the low-temperature side pump 11 in the low-temperature side pump flow path 31.

The high-temperature side pump 12 is disposed in a high-temperature side pump flow path 32. The coolant heater 15 is disposed on the coolant discharge side of the high-temperature side pump 12 in the high-temperature side pump flow path 32.

The radiator 13 is disposed in a radiator flow path 33. The temperature-adjustment target device 16 is disposed in a device flow path 36. The cooler core 17 is disposed in a cooler core flow path 37. The heater core 18 is disposed in a heater core flow path 38.

The low-temperature side pump flow path 31, the high-temperature side pump flow path 32, the radiator flow path 33, the device flow path 36, the cooler core flow path 37, and the heater core flow path 38 are connected to the first switching valve 19 and the second switching valve 20.

Each of the first and second switching valves 19 and 20 is a switching device (heat-medium flow switching device) that switches the flow of the coolant.

The first switching valve 19 is a multiport valve that includes a number of ports (first switching valve port) forming an inlet or outlet for the coolant. Specifically, the first switching valve 19 has a first inlet 19a and a second inlet 19b as the inlet for the coolant, and first to third outlets 19c to 19e as the outlet for the coolant.

The second switching valve 20 is a multiport valve that includes a number of ports (second switching valve port)

forming an inlet or outlet for the coolant. Specifically, the second switching valve 20 has a first outlet 20a and a second outlet 20b as the outlet for the coolant and first to third inlets 20c to 20e as the inlet for the coolant.

The first inlet 19a of the first switching valve 19 is connected to one end of the low-temperature side pump flow path 31. In other words, the first inlet 19a of the first switching valve 19 is connected to the coolant outlet side of the coolant cooler 14.

One end of the cooler core flow path 37 is connected to part of the low-temperature side pump flow path 31 between the coolant cooler 14 and the first switching valve 19. In other words, the coolant outlet side of the coolant cooler 14 is connected to the coolant inlet side of the cooler core 17.

The second inlet 19b of the first switching valve 19 is connected to one end of the high-temperature side pump flow path 32. In other words, the second inlet 19b of the first switching valve 19 is connected to the coolant outlet side of the coolant heater 15.

The first outlet 19c of the first switching valve 19 is connected to one end of the radiator flow path 33. In other words, the first outlet 19c of the first switching valve 19 is connected to the coolant inlet side of the radiator 13.

The second outlet 19d of the first switching valve 19 is connected to one end of the device flow path 36. In other words, the second outlet 19d of the first switching valve 19 is connected to the coolant inlet side of the temperature-adjustment target device 16.

The third outlet 19e of the first switching valve 19 is connected to one end of the heater core flow path 38. In other words, the third outlet 19e of the first switching valve 19 is connected to the coolant inlet side of the heater core 18.

The first outlet 20a of the second switching valve 20 is connected to the other end of the low-temperature side pump flow path 31. In other words, the first outlet 20a of the second switching valve 20 is connected to the coolant suction side of the low-temperature side pump 11.

The second outlet 20b of the second switching valve 20 is connected to the other end of the high-temperature side pump flow path 32. In other words, the second outlet 20b of the second switching valve 20 is connected to the coolant suction side of the high-temperature side pump 12.

The other end of the heater core flow path 38 is connected to part of the high-temperature side pump flow path 32 between the second switching valve 20 and the high-temperature side pump 12. In other words, the coolant suction side of the high-temperature side pump 12 is connected to the coolant outlet side of the heater core 18.

The first inlet 20c of the second switching valve 20 is connected to the other end of the radiator flow path 33. In other words, the first inlet 20c of the second switching valve 20 is connected to the coolant outlet side of the radiator 13.

The second inlet 20d of the second switching valve 20 is connected to the other end of the device flow path 36. In other words, the second inlet 20d of the second switching valve 20 is connected to the coolant outlet side of the temperature-adjustment target device 16.

The third inlet 20e of the second switching valve 20 is connected to the other end of the cooler core flow path 37. In other words, the third inlet 20e of the second switching valve 20 is connected to the coolant outlet side of the cooler core 17.

The first switching valve 19 can be configured to arbitrarily or selectively switch the communication state between the respective inlets 19a and 19b and outlets 19c to 19e. The second switching valve 20 can also be configured to arbitrarily or selectively switch the communication state between the respective outlets 20a and 20b and inlets 20c to 20e.

Specifically, the first switching valve 19 switches among a state in which the coolant discharged from the low-temperature side pump 11 flows, a state in which the coolant discharged from the high-temperature side pump 12 flows, and a state in which the coolant discharged from the low-temperature side pump 11 and the coolant discharged from the high-temperature side pump 12 do not flow, with respect to each of the radiator 13, the temperature-adjustment target device 16, and the heater core 18.

The second switching valve 20 switches among a state in which the coolant flows out to the low-temperature side pump 11, a state in which the coolant flows out to the high-temperature side pump 12, and a state in which the coolant does not flow out to the low-temperature side pump 11 or the high-temperature side pump 12, with respect to each of the radiator 13, the temperature-adjustment target device 16, and the cooler core 17.

Examples of the structures of the first and second switching valves 19 and 20 will be briefly described below. Each of the first and second switching valves 19 and 20 includes a case forming an outer shell and a valve body accommodated in the case. An inlet and an outlet for the coolant are formed in predetermined positions of the case. Each of the first and second switching valves is adapted to change the communication state between the inlet and outlet for the coolant by rotating its valve body.

The valve body of the first switching valve 19 and the valve body of the second switching valve 20 are rotatably driven independently by different electric motors. Alternatively, the valve body of the first switching valve 19 and the valve body of the second switching valve 20 may be rotatably driven in cooperation with a common electric motor.

The first switching valve 19 may be configured of a plurality of valve bodies. The second switching valve 20 may be configured of a plurality of valve bodies. The valve body of the first switching valve 19 may be mechanically coupled to the valve body of the second switching valve 20. The valve body of the first switching valve 19 and the valve body of the second switching valve 20 may be integrally formed together.

The low-temperature side pump 11, the high-temperature side pump 12, the coolant cooler 14, the coolant heater 15, the first switching valve 19, the second switching valve 20, the compressor 23, the expansion valve 24, and a relief valve 25 form a refrigeration cycle unit 40.

The refrigeration cycle unit 40 has a casing (not shown) that accommodates therein the low-temperature side pump 11, the high-temperature side pump 12, the coolant cooler 14, the coolant heater 15, the first switching valve 19, the second switching valve 20, the compressor 23, the expansion valve 24, and the relief valve 25.

The refrigeration cycle unit 40, the radiator 13, and the exterior blower 21 are disposed in an engine room of the vehicle. The interior air-conditioning unit 27 for accommodating therein the cooler core 17 and the heater core 18 is disposed inside the dashboard (instrumental panel) provided at the foremost portion of the vehicle interior.

Figure 2:
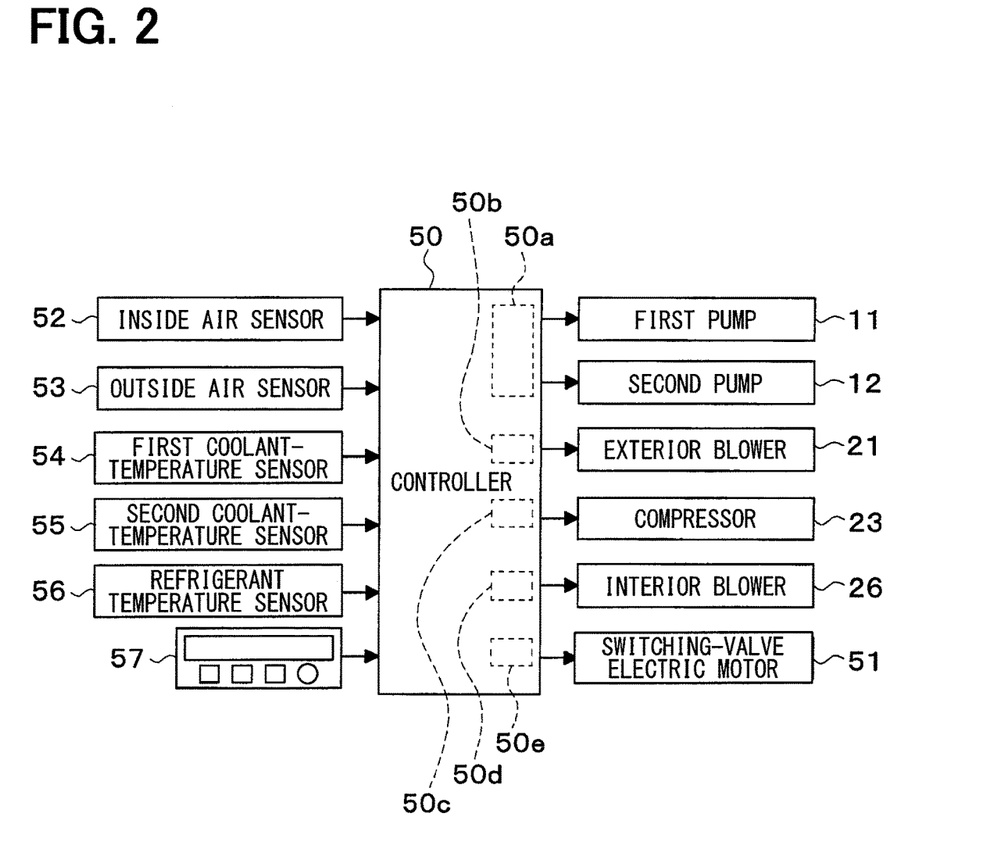
FIG. 2 is a block diagram showing an electric control unit in the vehicle thermal management system of the first embodiment.

Next, an electric control unit of the vehicle thermal management system 10 will be described with reference to FIG. 2. A controller 50 is configured of a known microcomputer, including CPU, ROM, and RAM, and a peripheral circuit thereof. The controller performs various computations and processing based on air-conditioning control programs stored in the ROM to thereby control the operations of the low-temperature side pump 11, high-temperature side pump 12, exterior blower 21, compressor 23, interior blower 26, switching-valve electric motor 51, and the like which are connected to the output side of the controller.

The switching-valve electric motor 51 is a switching valve driver that drives the valve body of the first switching valve 19 and the valve body of the second switching valve 20. In this embodiment, an electric motor for driving the valve body of the first switching valve 19 and an electric motor for driving the valve body of the second switching valve 20 are provided independently as the switching-valve electric motor 51.

The controller 50 incorporates therein control units (hardware and software) for controlling various control target devices connected to its output side.

A pump control unit 50a of the controller 50 is a pump control device for controlling the operations of the low-temperature side pump 11 and the high-temperature side pump 12. An outside-air blowing control unit 50b of the controller 50 is an outside-air blowing control device for controlling blowing of the outside air by regulating the operation of the exterior blower 21.

A compressor control unit 50c of the controller 50 is a compressor control device for controlling the operation of the compressor 23. An interior blower control unit 50d of the controller 50 is an interior blower control device for controlling the operation of the interior blower 26.

A switching valve control unit 50e of the controller 50 controls the operation of the switching-valve electric motor 51. Alternatively, the respective control units 50a, 50b, 50c, 50d, and 50e may be configured separately from the controller 50.

Detection signals from a group of sensors are input to the input side of the controller 50. The sensor group includes an inside air sensor 52, an outside air sensor 53, a first coolant-temperature sensor 54, a second coolant-temperature sensor 55, and a refrigerant temperature sensor 56.

The inside air sensor 52 is a detector (inside-air temperature detector) for detecting the temperature of the inside air (vehicle interior temperature). The outside air temperature sensor 53 is a detector (outside-air temperature detector) for detecting the temperature of the outside air (vehicle exterior temperature).

The first coolant-temperature sensor 54 is a detector (first heat-medium temperature detector) that detects the temperature of the coolant flowing through the low-temperature side pump flow path 31 (for example, the temperature of the coolant flowing out of the coolant cooler 14).

The second coolant-temperature sensor 55 is a detector (second heat-medium temperature detector) that detects the temperature of the coolant flowing through the high-temperature side pump flow path 32 (for example, the temperature of the coolant flowing out of the coolant heater 15).

The refrigerant temperature sensor 56 is a detector (refrigerant temperature detector) that detects the refrigerant temperature in the refrigeration cycle 22 (for example, the temperature of refrigerant discharged from the compressor 23, or the temperature of coolant flowing out of the coolant cooler 14). The refrigerant temperature sensor 56 may be placed in the heat exchanger placed in the refrigeration cycle 22 as appropriate.

For example, the inside air temperature, the outside air temperature, the coolant temperature, and the refrigerant temperature may be estimated based on detected values of various physical quantities.

Instead of the refrigerant temperature sensor 56, a refrigerant pressure sensor may be provided for detecting the refrigerant pressure in the refrigeration cycle 22 (for example, the pressure of the refrigerant discharged from the compressor 23, or the pressure of the coolant flowing out of the coolant cooler 14).

An operation signal from an air-conditioner switch 57 is input to the input side of the controller 50. The air-conditioner switch 57 is a switch for switching on and off of the air conditioner, and is disposed near the dashboard of the vehicle interior.

Next, the operation of the above-mentioned structure will be described. The controller 50 controls the operations of the low-temperature side pump 11, the high-temperature side pump 12, the compressor 23, the switching-valve electric motor 51, and the like, to thereby switch among various operation modes.

For example, a low-temperature side coolant circuit (low-temperature side heat medium circuit) is formed by the low-temperature side pump flow path 31 and at least one of the radiator flow path 33, the device flow path 36, the cooler core flow path 37, and the heater core flow path 38, while a high-temperature side coolant circuit (high-temperature side heat medium circuit) is formed by the high-temperature side pump flow path 32 and at least the other of the radiator flow path 33, the device flow path 36, the cooler core flow path 37, and the heater core flow path 38.

Each of the radiator flow path 33, device flow path 36, cooler core flow path 37, and heater core flow path 38 can be switched between a state of the connection to the low-temperature side coolant circuit and a state of the connection to the high-temperature side coolant circuit depending on the situation, thereby adjusting the radiator 13, temperature-adjustment target device 16, cooler core 17, and heater core 18 to respective appropriate temperatures according to the situation.

That is, when the coolant cooler 14 and the temperature-adjustment target device 16 are connected to the same coolant circuit, the coolant cooled by the coolant cooler 14 can cool the temperature-adjustment target device 16. When the coolant heater 15 and the temperature-adjustment target device 16 are connected to the same coolant circuit, the coolant heated by the coolant heater 15 can heat the temperature-adjustment target device 16.

When the coolant cooler 14 and the cooler core 17 are connected to the same coolant circuit, the ventilation air into the vehicle interior can be cooled by the cooler core 17, thereby performing air-cooling of the vehicle interior.

When the coolant heater 15 and the heater core 18 are connected to the same coolant circuit, the ventilation air into the vehicle interior can be heated by the heater core 18, thereby performing air-heating of the vehicle interior.

When the coolant cooler 14 and the radiator 13 are connected to the same coolant circuit, a heat pump operation of the refrigeration cycle 22 can be performed. That is, in the low-temperature side coolant circuit, the coolant cooled by the coolant cooler 14 flows through the radiator 13, allowing the coolant to absorb heat from the outside air in the radiator 13. Then, the coolant absorbing heat from the outside air in the radiator 13 exchanges heat with the refrigerant in the refrigeration cycle 22 to dissipate heat at the coolant cooler 14. Thus, in the coolant cooler 14, the refrigerant in the refrigeration cycle 22 absorbs heat from outside air via the coolant.

The refrigerant having absorbed heat from the outside air at the coolant cooler 14 exchanges heat with the coolant in the high-temperature side coolant circuit to thereby dissipate the heat at the coolant heater 15. Therefore, a heat-pump operation for pumping up the heat from the outside air can be achieved.

Figure 3:
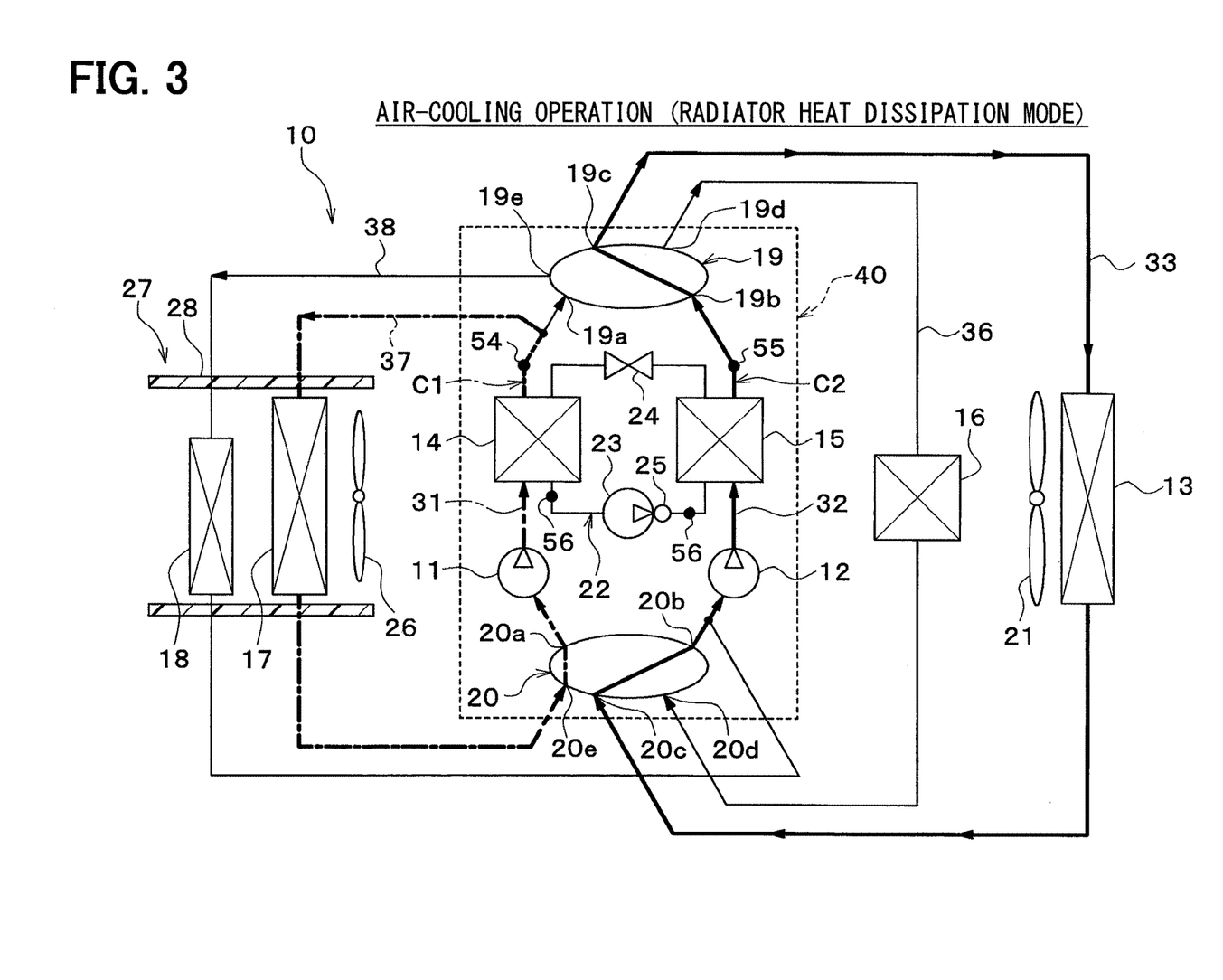
FIG. 3 is a diagram showing the state of a coolant flow during an air-cooling operation in the vehicle thermal management system of the first embodiment.

FIG. 3 shows an example of the configuration of the coolant circuit in the air-cooling operation. In the air-cooling operation, as indicated by a thick alternate long and short dash line of FIG. 3, the coolant cooler 14 and the cooler core 17 are connected to a low-temperature side coolant circuit C1, while as indicated by a thick solid line of FIG. 3, the coolant heater 15 and the radiator 13 are connected to a high-temperature side coolant circuit C2.

In the low-temperature side coolant circuit C1, the coolant cooled by the coolant cooler 14 flows through the cooler core 17, whereby the coolant absorbs heat at the cooler core 17 from the ventilation air into the vehicle interior. The coolant having absorbed heat at the cooler core 17 from the ventilation air into the vehicle interior exchanges the heat with the refrigerant in the refrigeration cycle 22 to dissipate heat at the coolant cooler 14. Thus, in the coolant cooler 14, the refrigerant in the refrigeration cycle 22 absorbs heat from the ventilation air into the vehicle interior via the coolant.

The refrigerant having absorbed heat in the coolant cooler 14 exchanges heat with the coolant in the high-temperature side coolant circuit C2 to dissipate heat at the coolant heater 15. The coolant receiving heat dissipated from the refrigerant in the coolant heater 15 exchanges the heat with the outside air to dissipate heat at the radiator 13. Hereinafter, a mode of the coolant flow shown in FIG. 3 is referred to as a radiator heat dissipation mode.

Figure 4:
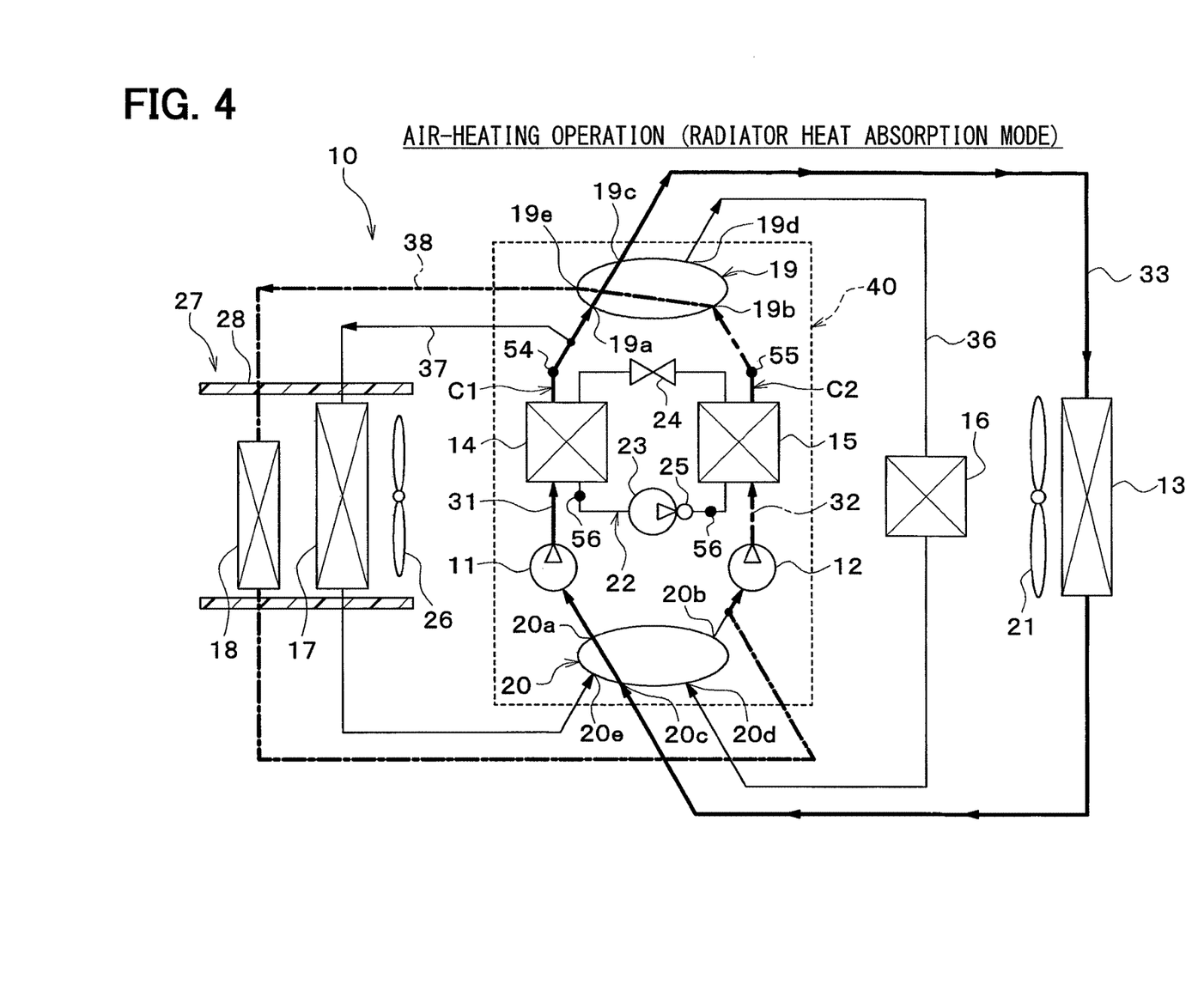
FIG. 4 is a diagram showing the state of a coolant flow during an air-heating operation in the vehicle thermal management system of the first embodiment.

FIG. 4 shows an example of the configuration of the coolant circuit in the air-heating operation. In the air-heating operation, as indicated by a thick solid line of FIG. 4, the coolant cooler 14 and the radiator 13 are connected to a low-temperature side coolant circuit C1, while as indicated by a thick alternate long and short dash line of FIG. 4, the coolant heater 15 and the heater core 18 are connected to a high-temperature side coolant circuit C2.

In the low-temperature side coolant circuit C1, the coolant cooled by the coolant cooler 14 flows through the radiator 13, whereby the coolant absorbs heat from the outside air in the radiator 13. Hereinafter, a mode of the coolant flow shown in FIG. 4 is referred to as a radiator heat absorption mode.

The coolant absorbing heat from the outside air in the radiator 13 exchanges heat with the refrigerant in the refrigeration cycle 22, thereby allowing the heat of the coolant to be absorbed in the coolant cooler 14. Thus, in the coolant cooler 14, the refrigerant in the refrigeration cycle 22 absorbs heat from the outside air via the coolant.

The refrigerant having absorbed heat in the coolant cooler 14 exchanges heat with the coolant in the high-temperature side coolant circuit C2 to thereby dissipate heat at the coolant heater 15. The coolant receiving heat dissipated from the refrigerant in the coolant heater 15 exchanges heat with the ventilation air into the vehicle interior to dissipate the heat in the heater core 18.

Figure 5:
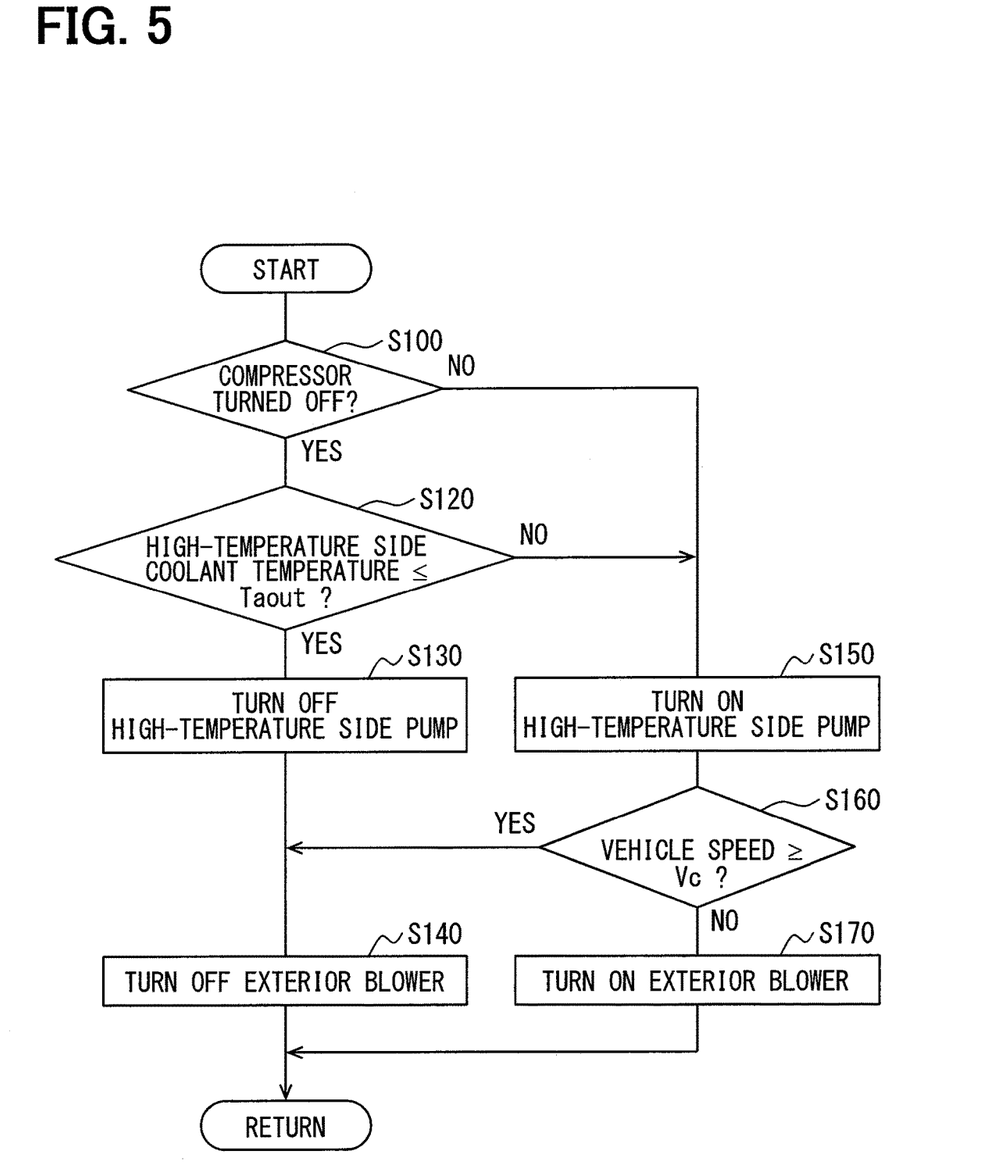
FIG. 5 is a flowchart showing a control processing executed during the air-cooling operation in the vehicle thermal management system of the first embodiment.

In the radiator heat dissipation mode shown in FIG. 3, the controller 50 performs control processing shown in a flowchart of FIG. 5. The control processing is performed even when an ignition switch of the vehicle is turned off.

In step S100, it is determined whether or not the compressor 23 is in a stopped state (i.e. turned off). Since in this embodiment the compressor 23 is an engine-driven compressor, the compressor 23 also stops when the engine stops.

When the compressor 23 is determined not to be in the stopped state (i.e. turned off) in step S100, the operation proceeds to step S150, in which the high-temperature side pump 12 is brought into an operating state (i.e. turned on). Thus, the coolant circulates through the radiator 13, whereby the coolant dissipates heat into the outside air at the radiator 13.

On the other hand, when the compressor 23 is determined to be in the stopped state (i.e. turned off), the operation proceeds to step S120. In step S120, it is determined whether or not the coolant temperature (high-temperature side coolant temperature) in the high-temperature side coolant circuit C2 is equal to or lower than an outside air temperature Taout.

When the coolant temperature (high-temperature side coolant temperature) in the high-temperature side coolant circuit C2 is determined to be equal to or lower than the outside air temperature Taout, the operation proceeds to step S130, in which the high-temperature side pump 12 is brought into the stopped state (i.e. turned off). Thus, the coolant does not circulate through the radiator 13. In subsequent step S140, the exterior blower 21 is brought into the stopped state (i.e. turned off).

On the other hand, when the coolant temperature (high-temperature side coolant temperature) in the high-temperature side coolant circuit C2 is determined not to be equal to or lower than the outside air temperature Taout in step S120, the operation proceeds to step S150, in which the high-temperature side pump 12 is brought into the operating state (i.e. turned on). Thus, the coolant circulates through the radiator 13, whereby the coolant dissipates heat into the outside air in the radiator 13.

Therefore, since the cooling of the coolant is continued even after the compressor 23 is stopped, the coolant can be prevented from keeping its temperature high or from increasing its temperature after the stopping of the compressor 23. Thus, the pressure of the coolant heater 15 can be decreased, whereby the starting torque of the compressor can be decreased when restarting the compressor 23, thereby suppressing degradation in cycle efficiency.

In subsequent step S160, it is determined whether or not the vehicle speed is equal to or higher than a predetermined speed Vc. The predetermined speed Vc is the lower limit of vehicle speed at which the volume of the traveling air hitting the radiator 13 is equal to or more than the volume of air required for the heat dissipation in the radiator 13. That is, when the vehicle speed is equal to or higher than the predetermined speed Vc, the volume of the traveling air hitting the radiator 13 becomes equal to or more than the volume of air required for the heat dissipation in the radiator 13, whereby the exterior blower 21 does not need to blow the outside air toward the radiator 13.

When the vehicle speed is determined not to be equal to or higher than the predetermined speed Vc, the operation proceeds to step S170, in which the exterior blower 21 is brought into the operating state (i.e. turned on). Thus, the outside air is blown into the radiator 13.

On the other hand, when the vehicle speed is determined to be equal to or higher than the predetermined speed Vc, the operation proceeds to step S140, in which the exterior blower 21 is brought into the stopped state (i.e. turned off). In this way, when the volume of the traveling air hitting the radiator 13 is equal to or more than the volume of air required for the heat dissipation in the radiator 13, the exterior blower 21 can be stopped to reduce the power consumption by the exterior blower 21.

Figure 6:
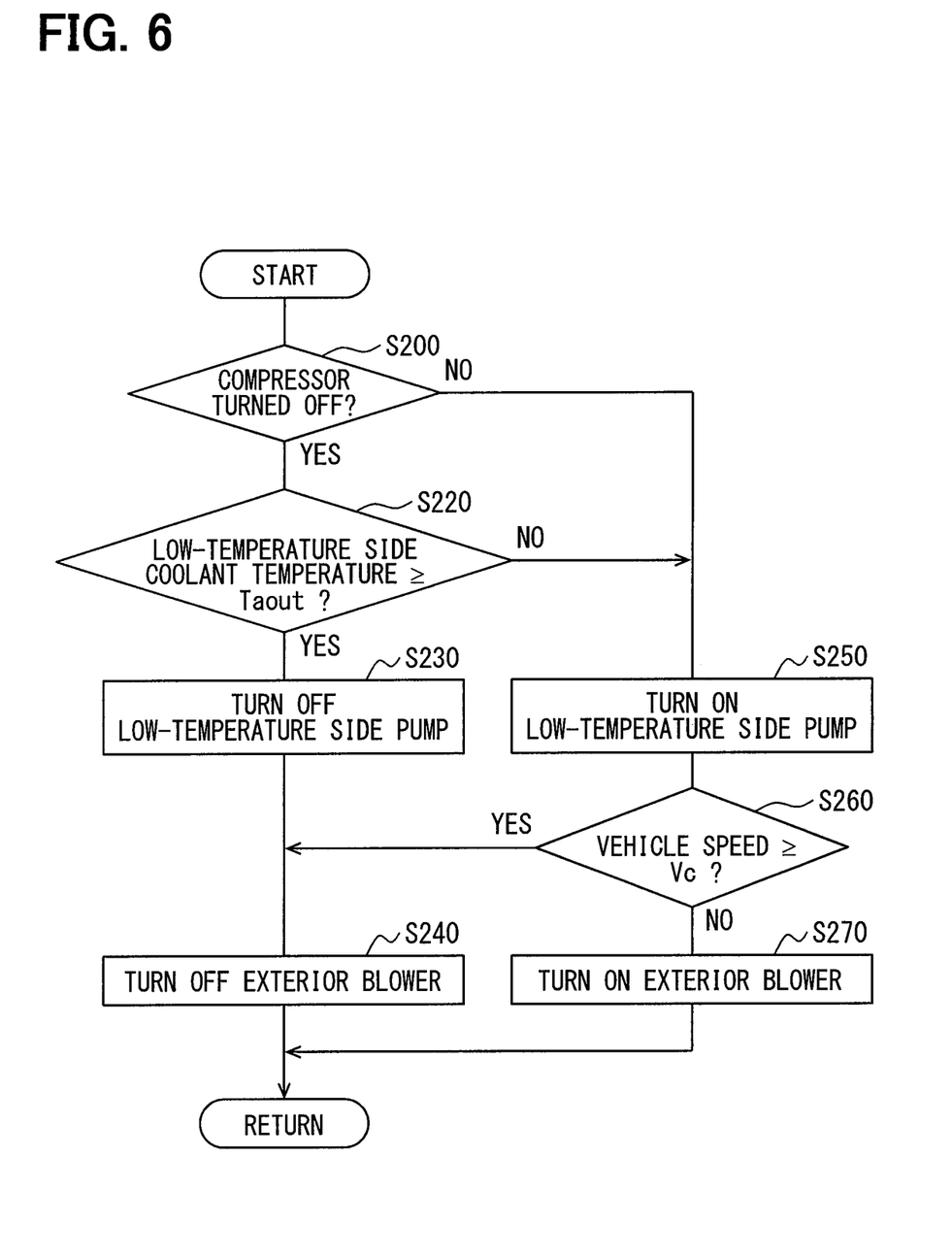
FIG. 6 is a flowchart showing a control processing executed during the air-heating operation in the vehicle thermal management system of the first embodiment.

In the radiator heat absorption mode shown in FIG. 4, the controller 50 performs control processing shown in a flowchart of FIG. 6. The control processing is performed even when an ignition switch of the vehicle is turned off.

In step S200, it is determined whether or not the compressor 23 is in the stopped state (i.e. turned off). When the compressor 23 is determined not to be in the stopped state (i.e. turned off), the operation proceeds to step S250, in which the low-temperature side pump 11 is brought into the operating state (i.e. turned on). Since the coolant circulates through the radiator 13, the coolant absorbs heat from the outside air in the radiator 13.

On the other hand, when the compressor 23 is determined to be in the stopped state (i.e. turned off), the operation proceeds to step S220. In step S220, it is determined whether or not the coolant temperature (low-temperature side coolant temperature) in the low-temperature side coolant circuit C1 is equal to or higher than an outside air temperature Taout.

When the coolant temperature (low-temperature side coolant temperature) in the low-temperature side coolant circuit C1 is determined to be equal to or higher than the outside air temperature Taout, the operation proceeds to step S230, in which the low-temperature side pump 11 is brought into the stopped state (i.e. turned off). Thus, the coolant does not circulate through the radiator 13. In subsequent step S240, the exterior blower 21 is brought into the stopped state (i.e. turned off).

On the other hand, when the coolant temperature (low-temperature side coolant temperature) in the low-temperature side coolant circuit C1 is determined not to be equal to or higher than the outside air temperature Taout in step S220, the operation proceeds to step S250, in which the low-temperature side pump 11 is brought into the operating state (i.e. turned on). Since the coolant circulates through the radiator 13, the coolant absorbs heat from the outside air in the radiator 13.

Therefore, since the heat absorption by the coolant is continued even after the compressor 23 is stopped, the coolant can increase its temperature without keeping its temperature low after stopping of the compressor 23. Thus, the thermal management system can suppress the reduction in the heat absorption amount by the refrigerant due to a decrease in a temperature difference between the refrigerant and coolant in the low-pressure side heat exchanger 14 when restarting the compressor 23, thereby preventing the degradation in the cycle efficiency.

In subsequent step S260, it is determined whether or not the vehicle speed is equal to or more than the predetermined speed Vc. The predetermined speed Vc is the lower limit of vehicle speed at which the volume of the traveling air hitting the radiator 13 is equal to or more than the volume of air required for the heat dissipation in the radiator 13. That is, when the vehicle speed is equal to or higher than the predetermined speed Vc, the traveling air hitting the radiator 13 becomes equal to or more than the amount of air required for the heat dissipation in the radiator 13, whereby the exterior blower 21 does not need to blow the outside air toward the radiator 13.

When the vehicle speed is determined not to be equal to or higher than the predetermined speed Vc, the operation proceeds to step S270, in which the exterior blower 21 is brought into the operating state (i.e. turned on). Thus, the outside air is blown into the radiator 13.

On the other hand, when the vehicle speed is determined to be equal to or higher than the predetermined speed Vc, the operation proceeds to step S240, in which the exterior blower 21 is brought into the stopped state (i.e. turned off). In this way, when the volume of the traveling air hitting the radiator 13 is equal to or more than the volume of air required for the heat dissipation in the radiator 13, the exterior blower 21 can be stopped to reduce the power consumption by the exterior blower 21.

In this embodiment, when switching the first switching valve 19 and the second switching valve 20 to the radiator heat dissipation mode (first circulation state), the pump control unit 50a continues the operation of the high-temperature side pump 12 (first pump) even after the compressor 23 is stopped (in step S150).

Thus, after the compressor 23 is stopped, the circulation of the coolant toward the radiator 13 is continued by using the high-temperature side pump 12, thereby allowing the radiator 13 to cool the coolant. Because of this, the coolant can be prevented from keeping its temperature high or increasing its temperature even after the compressor 23 is stopped, thereby decreasing the pressure of the coolant heater 15. As a result, the starting torque of the compressor can be decreased when restarting the compressor 23, which can suppress the degradation in cycle efficiency.

When the operation of the high-temperature side pump 12 is continued after the stopping of the compressor 23, the pump control unit 50a stops the high-temperature side pump 12 if a difference obtained by subtracting the outside air temperature from the coolant temperature is determined to be equal to or less than a first predetermined value (0° C. in this embodiment) (in step S130).

With this arrangement, after the stopping of the compressor 23, the power consumption by the high-temperature side pump 12 can be reduced. The first predetermined value can be set as appropriate.

When the first and second switching valves 19 and 20 switch to the radiator heat dissipation mode (first circulation state), the outside-air blowing control unit 50b continues the operation of the exterior blower 21 after the stopping of the compressor 23 (in step S170).

Thus, since the blowing of the outside air to the radiator 13 by the exterior blower 21 is continued after the stopping of the compressor 23, the heat exchanging at the radiator 13 can be promoted through blowing the outside air to the radiator 13.

When the operation of the exterior blower 21 is continued after the stopping of the compressor 23, the outside-air blowing control unit 50b stops the exterior blower 21 if a difference obtained by subtracting the outside air temperature from the coolant temperature is determined to be equal to or less than the first predetermined value (0° C. in this embodiment) (in step S140).

With this arrangement, after the stopping of the compressor 23, the power consumption by the exterior blower 21 can be reduced.

In this embodiment, when the first and second switching valves 19 and 20 switch to the radiator heat absorption mode (second circulation state), the pump control unit 50a continues the operation of the low-temperature side pump 11 (second pump) even after the compressor 23 is stopped (in step S250).

Thus, even after the compressor 23 is stopped, the circulation of the coolant toward the radiator 13 is continued by using the low-temperature side pump 11, thereby allowing the radiator 13 to absorb heat from the outside air. In this way, after the stopping of the compressor 23, the temperature of the coolant can be increased without being kept low. Thus, the thermal management system can suppress the reduction in the heat absorption amount by the refrigerant due to a decrease in the temperature difference between the refrigerant and coolant in the low-pressure side heat exchanger 14 when restarting the compressor 23, thereby preventing the degradation in the cycle efficiency.

When the operation of the low-temperature side pump 11 is continued after the stopping of the compressor 23, the pump control unit 50a stops the low-temperature side pump 11 if a difference obtained by subtracting the coolant temperature from the outside air temperature is determined to be equal to or less than a second predetermined value (0° C. in this embodiment) (in step S230).

With this arrangement, after the stopping of the compressor 23, the power consumption by the low-temperature side pump 11 can be reduced. The second predetermined value can be set as appropriate.

When the first and second switching valves 19 and 20 switch to the radiator heat absorption mode (second circulation state), the outside-air blowing control unit 50b continues the operation of the exterior blower 21 even after the stopping of the compressor 23 (in step S270).

Thus, since the blowing of the outside air to the radiator 13 by the exterior blower 21 is continued after the stopping of the compressor 23, the heat exchanging at the radiator 13 can be promoted through blowing the outside air to the radiator 13.

When the operation of the exterior blower 21 is continued after the stopping of the compressor 23, the outside-air blowing control unit 50b stops the exterior blower 21 if a difference obtained by subtracting the coolant temperature from the outside air temperature is determined to be equal to or less than the second predetermined value (0° C. in this embodiment) (in step S240).

With this arrangement, after the stopping of the compressor 23, the power consumption by the exterior blower 21 can be reduced.

In this embodiment, the compressor 23 is driven by a driving force generated by the engine. In such a compressor 23, the increase in pressure of the refrigerant is suppressed after the stopping of the compressor 23, whereby the starting torque can be drastically suppressed when restarting the compressor 23.

Second Embodiment

Figure 7:
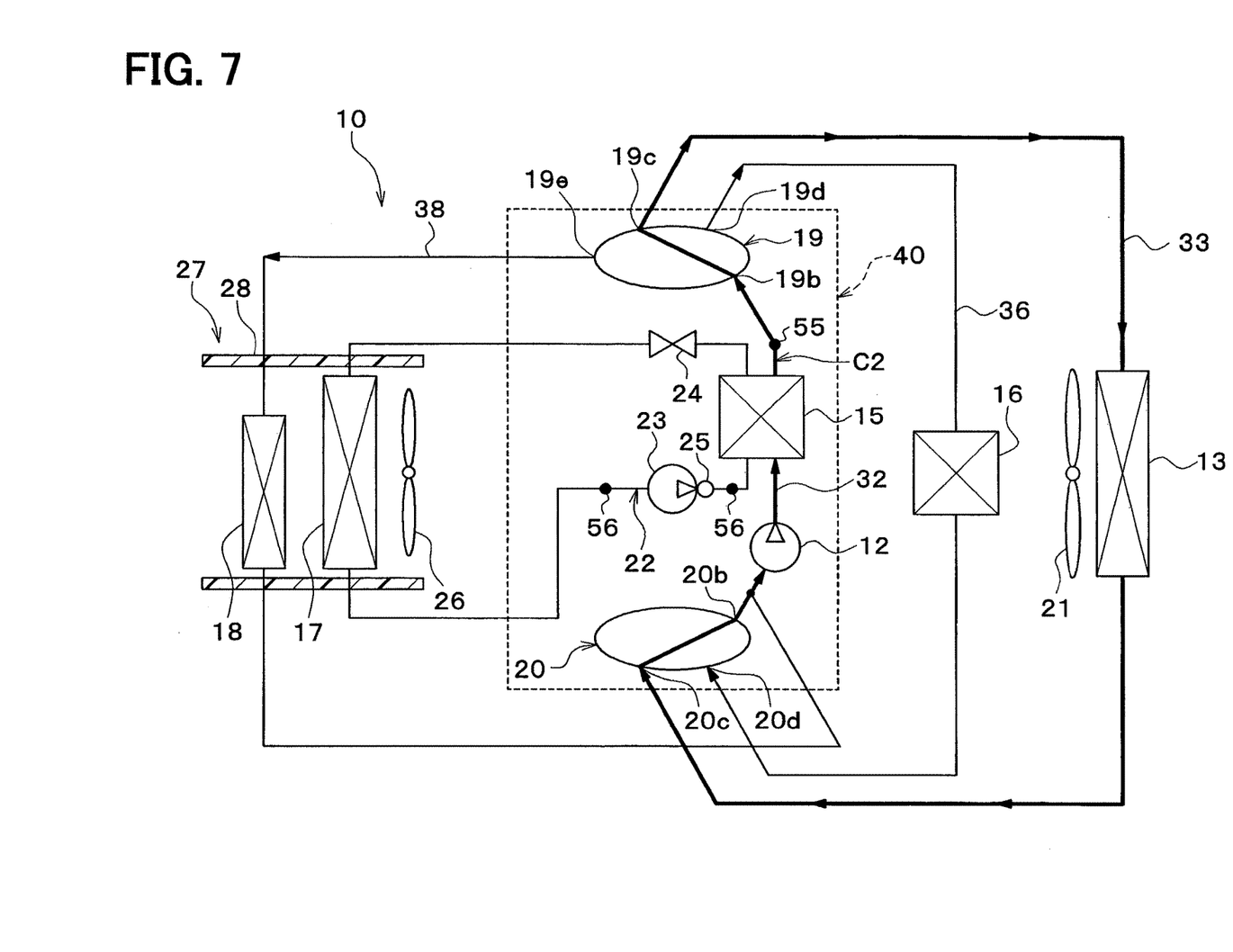
FIG. 7 is an entire configuration diagram of a vehicle thermal management system according to a second embodiment.

In this embodiment, as shown in FIG. 7, an evaporator 60 is provided in place of the coolant cooler 14 and the cooler core 17 of the above-mentioned first embodiment.

The evaporator 60 is an air cooling heat exchanger (air-refrigerant heat exchanger) that cools the ventilation air into the vehicle interior by exchanging heat between the low-pressure side refrigerant in the refrigeration cycle 22 and the ventilation air into the vehicle interior.

The evaporator 60 evaporates a low-pressure refrigerant by exchanging heat between the low-pressure refrigerant decompressed and expanded by the expansion valve 24 and the ventilation air into the vehicle interior. The gas-phase refrigerant evaporated at the evaporator 60 is drawn into and compressed by the compressor 23.

Also in this embodiment, an air-cooling operation (radiator heat dissipation mode) can be performed in the same manner as in the first embodiment.

In the radiator heat dissipation mode, the controller 50 performs control processing shown in a flowchart of FIG. 5. Like the above-mentioned first embodiment, this embodiment can suppress the degradation in the cycle efficiency that would be caused when restarting the compressor 23.

Other Embodiments

The above-mentioned embodiments can be combined as appropriate. Various modifications and changes can be made to the above-mentioned embodiments, for example, in the following way.

(1) Although in the above-mentioned embodiments, the coolant is used as the heat medium, various kinds of media, such as oil, may be used as the heat medium.

Alternatively, nanofluid may be used as the heat medium. The nanofluid is a fluid containing nanoparticles having a diameter of the order of nanometer. By mixing the nanoparticles into the heat medium, the following functions and effects can be obtained, in addition to the function and effect of decreasing a freezing point, like a coolant (so-called antifreeze) using ethylene glycol.

That is, the use of the nanoparticles exhibits the functions and effects of improving the thermal conductivity in a specific temperature range, increasing the thermal capacity of the heat medium, preventing the corrosion of a metal pipe and degradation of a rubber pipe, and enhancing the fluidity of the heat medium at an ultralow temperature.

These functions and effects are varied depending on the configuration, shape, and blending ratio of the nanoparticles, and additive material.

Thus, the mixture of nanoparticles in the heat medium can improve its thermal conductivity, and even in a small amount, can exhibit the substantially same cooling efficiency as that of the coolant using ethylene glycol.

Further, such a heat medium can also improve its thermal capacity and increase a cold storage amount (cold storage due to its sensible heat) of the heat medium itself.

By increasing the cold storage amount, the temperature adjustment, including cooling and heating, of the device can be performed using the cold storage for some period of time even though the compressor 23 is not operated, which can save the power of the vehicle thermal management system 10.

An aspect ratio of the nanoparticle is preferably 50 or more. This is because such an aspect ratio can provide the adequate thermal conductivity. Note that the aspect ratio of the nanoparticle is a shape index indicating the ratio of the width to the height of the nanoparticle.

Nanoparticles suitable for use can include any one of Au, Ag, Cu, and C. Specifically, atoms configuring the nanoparticles can include an Au nanoparticle, an Ag nanowire, a carbon nanotube (CNT), a graphene, a graphite core-shell nanoparticle (a particle body with the above-mentioned atom surrounded by a structure, such as a carbon nanotube), an Au nanoparticle-containing CNT, and the like.

(2) In the refrigeration cycle 22 of the above-mentioned embodiments, a fluorocarbon refrigerant is used as the refrigerant. However, the kind of refrigerant is not limited thereto, and may be natural refrigerant, such as carbon dioxide, a hydrocarbon refrigerant, and the like.

The refrigeration cycle 22 in the above-mentioned embodiments constitutes a subcritical refrigeration cycle in which its high-pressure side refrigerant pressure does not exceed the critical pressure of the refrigerant, but may constitute a super-critical refrigeration cycle in which its high-pressure side refrigerant pressure exceeds the critical pressure of the refrigerant.

(3) Although in the above-mentioned embodiments, the compressor 23 is the engine-driven compressor, the compressor 23 may be an electric compressor driven by an electric motor.

(4) In the above-mentioned embodiments, the vehicle thermal management system 10 is applied to the hybrid vehicle by way of example. Alternatively, the vehicle thermal management system 10 may be applied to an electric vehicle that does not include an engine and obtains a driving force for traveling from a traveling electric motor, a fuelbattery vehicle that travels with power generated by a reaction between hydrogen and oxygen, or the like.

What is claimed is:

1. A thermal management system for a vehicle, comprising:
a first pump that draws and discharges a heat medium;
a compressor that draws and discharges a refrigerant in a refrigeration cycle;
a high-pressure side heat exchanger that exchanges heat between a high-pressure side refrigerant in the refrigeration cycle and the heat medium circulated by the first pump;
a heat medium-outside air heat exchanger that exchanges heat between the heat medium circulated by the first pump and outside air; and
a controller that includes a pump control unit, wherein
the pump control unit is configured to control an operation of the first pump such that the operation of the first pump is continued even after the compressor is stopped,
the controller is configured to
obtain a temperature of the outside air and a temperature of the heat medium, and
determine whether the compressor is stopped and the operation of the first pump is continued,
the controller determines whether a difference obtained by subtracting a temperature of the outside air from a temperature of the heat medium is equal to or less than a first predetermined value when the operation of the first pump is continued while the compressor is stopped, and
the pump control unit stops the first pump when the controller determines that the difference is equal to or less than the first predetermined value.

2. The thermal management system for a vehicle according to claim 1, further comprising:
a second pump that draws and discharges the heat medium;
a low-pressure side heat exchanger that exchanges heat between a low-pressure side refrigerant in the refrigeration cycle and the heat medium circulated by the second pump; and
a switching device switching between a first circulation state in which the heat medium circulates between the heat medium-outside air heat exchanger and the first pump and a second circulation state in which the heat medium circulates between the heat medium-outside air heat exchanger and the second pump, wherein
when the switching device switches to the second circulation state, the pump control unit controls an operation of the second pump such that the operation of the second pump is continued even after the compressor is stopped.

3. The thermal management system for a vehicle according to claim 2, wherein
in a case where the operation of the second pump is continued after the compressor is stopped, the pump control unit stops the second pump when a difference obtained by subtracting a temperature of the heat medium from a temperature of the outside air is determined to be equal to or less than a second predetermined value.

4. The thermal management system for a vehicle according to claim 1, further comprising:
an outside-air blower that blows the outside air to the heat medium-outside air heat exchanger; and
an outside-air blowing control unit that controls an operation of the outside-air blower such that the operation of the outside-air blower is continued even after the compressor is stopped.

5. The thermal management system for a vehicle according to claim 1, further comprising:
an outside-air blower that blows the outside air to the heat medium-outside air heat exchanger; and
an outside-air blowing control unit that controls an operation of the outside-air blower such that the operation of the outside-air blower is continued even after the compressor is stopped, wherein
in a case where the operation of the outside-air blower is continued after the compressor is stopped, the outside-air blowing control unit stops the outside-air blower when a difference obtained by subtracting a temperature of the outside air from a temperature of the heat medium is determined to be equal to or less than the first predetermined value.

6. The thermal management system for a vehicle according to claim 3, further comprising:
an outside-air blower that blows the outside air to the heat medium-outside air heat exchanger; and
an outside-air blowing control unit that controls an operation of the outside-air blower such that the operation of the outside-air blower is continued even after the compressor is stopped, wherein
in a case where the operation of the outside-air blower is continued after the compressor is stopped, the outside-air blowing control unit stops the outside-air blower when a difference obtained by subtracting a temperature of the heat medium from a temperature of the outside air is determined to be equal to or less than the second predetermined value.

7. The thermal management system for a vehicle according to claim 1, wherein
the compressor is driven by a driving force generated from the engine.

* * * * *